(12) United States Patent
Talanis et al.

(10) Patent No.: US 7,941,858 B2
(45) Date of Patent: May 10, 2011

(54) ACCESS LICENSING FOR AN AUTOMATION DEVICE

(75) Inventors: Thomas Talanis, Heroldsbach (DE); Thomas Tröster, Dittenheim (DE); Frank Volkmann, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 1439 days.

(21) Appl. No.: 11/179,305

(22) Filed: Jul. 12, 2005

(65) Prior Publication Data
US 2006/0031171 A1 Feb. 9, 2006

(30) Foreign Application Priority Data
Jul. 15, 2004 (EP) .................... 04016714

(51) Int. Cl.
*H04L 29/00* (2006.01)

(52) U.S. Cl. .............. 726/26; 726/10; 707/2; 705/59

(58) Field of Classification Search .......... 726/26, 726/10; 707/2; 705/59
See application file for complete search history.

(56) References Cited

U.S. PATENT DOCUMENTS

| | | | |
|---|---|---|---|
| 6,219,652 B1 * | 4/2001 | Carter et al. | 726/28 |
| 6,421,768 B1 * | 7/2002 | Purpura | 726/8 |
| 7,181,438 B1 * | 2/2007 | Szabo | 707/2 |
| 2004/0215570 A1 * | 10/2004 | Uemura et al. | 705/59 |

FOREIGN PATENT DOCUMENTS

| | | |
|---|---|---|
| WO | WO 00/36807 A2 | 6/2000 |
| WO | WO 03/067388 A2 | 8/2003 |
| WO | WO 03/067826 A2 | 8/2003 |

* cited by examiner

*Primary Examiner* — Vivek Srivastava
*Assistant Examiner* — Thong Truong

(57) ABSTRACT

The invention relates to a method and a system for access licensing for an automation device. In order to simplify access licensing for an automation device it is proposed to use client-side licenses. Thus the license is no longer linked to the automation device.

1 Claim, 1 Drawing Sheet

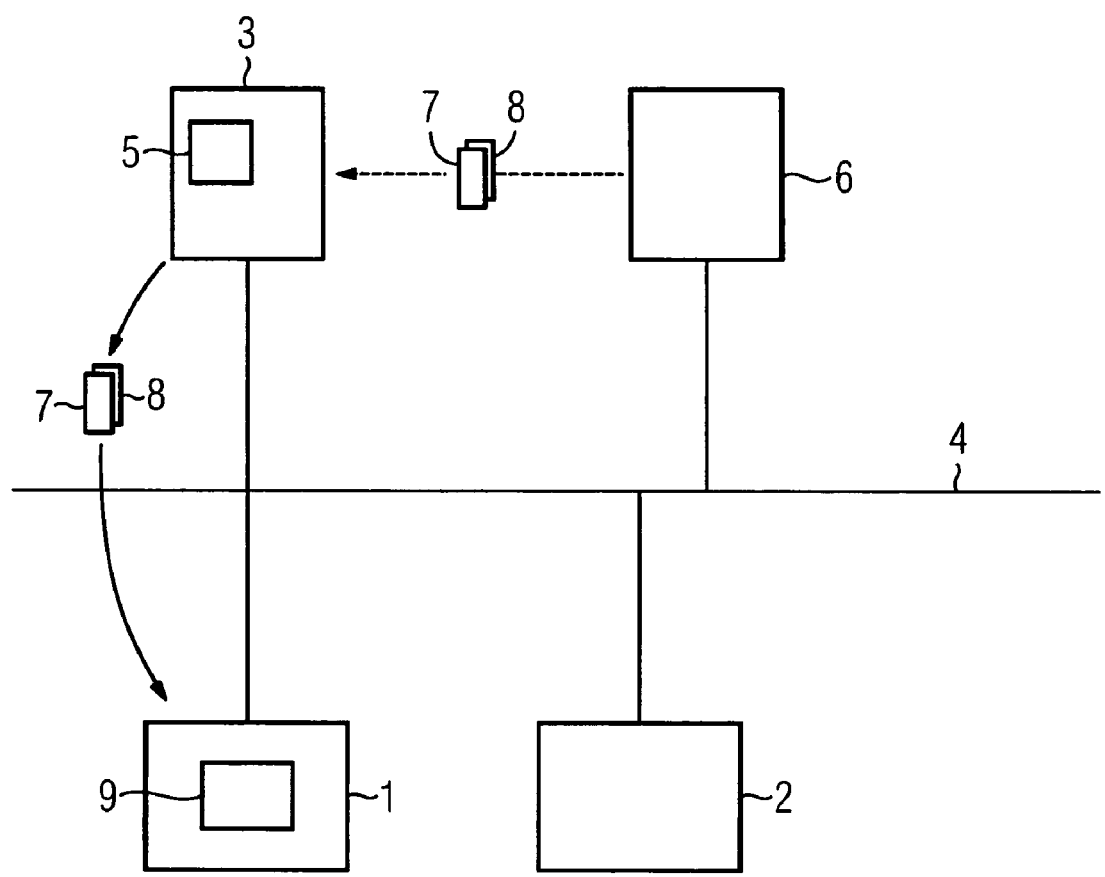

ACCESS LICENSING FOR AN AUTOMATION DEVICE

CROSS REFERENCE TO RELATED APPLICATIONS

This application claims priority to the European application No. 04016714.0, filed Jul. 15, 2004 and which is incorporated by reference herein in its entirety.

FIELD OF INVENTION

The invention relates to a method and a system for access licensing for an automation device.

BACKGROUND OF THE INVENTION

Incorporation of automation devices into a computer network architecture, particularly into a client-server structure, is known from the prior art. According to the prior art, licensing access to particular functionalities of the automation device is undertaken by the automation device itself, said automation device monitoring and administering the number of licenses permitted.

SUMMARY OF THE INVENTION

The object of the present invention is to simplify access licensing for an automation device.

This object is achieved by the claims. A client-side license is used in the inventive method for access licensing for an automation device taking on functionalities of a server in a client-server structure.

A basic concept of the invention is to use client-side licenses to perform licensing. Thus the license is no longer linked to the automation device. Moreover, the use of client certificates for licensing is particularly secure and ensures reliable licensing.

With the aid of the inventive method users can easily invoke a right (license) to access or use a functionality of an automation device. Expensive administrative procedures can be dispensed with. Examples of devices used as a client include a computer, a notebook, PDA or any other machine, preferably designed for operating an automation device, on which a web browser or other software supporting the use of an inventive client-side license runs. To operate any number of automation devices a user, for example a maintenance engineer, requires only a single license.

It is particularly advantageous if no licensing software or suchlike need be installed on the client for this purpose. Thus the administrative effort can be reduced to virtually zero. Moreover, the hardware requirements for the client are reduced considerably (thin client). The sole requirement for the client is that a web browser or suchlike can run on it.

According to a preferred embodiment of the invention the license information is transferred with an SSL client certificate from the client to the automation device. In other words provision is made for using the mechanism of the SSL certification (SSL=Secure Socket Layer) as a license mechanism.

It is already known for the client or its user to be authenticated via a client certificate in order to ensure access protection. According to the invention a set of license information is now combined in one certificate and presented when a communication link is set up between client and automation device. This preferably happens automatically when the SSL connection is set up, in that the automation device requests the client certificate. After the automation device has checked the certificate it approves access within the scope of the license. To this end the license information includes approval information giving entitlement to use defined functions, preferably to use function packets. Users of the certificates can preferably themselves determine which functionalities are combined in such a function package. To this end an advantageous embodiment of the invention provides that the certificates are acquired from a certification office and the scope of the license is hereby stipulated.

The inventive method permits what is known as a floating license model, in which a check is made to see how may clients can use a service on an automation device simultaneously. It is assumed here that a user, for example a maintenance engineer, needs a license in order to use a functionality on n controllers. In similar fashion, n users must produce n licenses to be able to access an automation device simultaneously. In this connection an automation device is understood as any device which can make SSL connections available and process client certificates.

It is especially advantageous in this connection if particular automation devices are brought together or grouped in technological units. If one certificate is then provided for each of these technological units, the required number of licenses is reduced further.

In another embodiment of the invention, a cookie mechanism is used instead of client certificates, in order to transfer the license information from the client to the automation device. Using cookies dispenses with the expensive encryption of the transmission channel using SSL, which slows down communication. Using cookies for licensing thus permits a particularly low-cost implementation.

The cookie mechanism is preferably set up so that the client automatically presents the license information to the automation device as a cookie via its web browser. Advantageously the license information, as in the example of the client certificates described above, can be acquired in advance by the user. According to a particularly customer-friendly embodiment of the invention this acquisition takes place in an online procedure in which the customer requests the licenses he requires on a web site, and these are generated online and made available to him, for example by transmitting a license file by FTP (file transfer protocol).

To enable the cookie mechanism to be used in communication between the client and the automation device, an exchange of information must take place between client and automation device before the actual communication, such that the automation device also reads out the cookies provided by the client.

Of advantage in the inventive method is that the required infrastructure is already available in the form of SSL technologies, cookie mechanisms, etc. In other words, the inventive licensing method can be implemented with very little expense by means of a minor modification to known systems.

In the following an exemplary embodiment of the invention based on the FIGURE is explained in greater detail.

BRIEF DESCRIPTION OF THE DRAWING

The sole FIGURE shows a schematic overview of the inventive method.

DETAILED DESCRIPTION OF THE INVENTION

So that a user can access an automation device 1, 2 in the form of an SPC (stored-program controller, or PLC (Programmable Logical Control) and use, i.e. access, parameterize, etc., the individual function modules of the SPC, for example a diagnostic buffer, variable access or the like, it requires a client 3, here in the form of a notebook. The client 3 is linked via a company-internal or company-external computer network 4, for example the internet, to the automation device 1, 2 and is designed to execute a web browser 5.

Before accessing the automation device 1, 2 the user establishes a connection between the client 3 and a licensing computer 6 via the network 4. The licensing computer 6, which is preferably operated by the manufacturer of the automation device, here makes available SSL client certificates 7 containing access license information 8 in an online process. The user can compile and acquire the access licenses in line with his requirements, and transfer them from the licensing computer 6 to the client 3. If the user has received the certificate 7, he can preferably use this as many times as required. In other words, it is not necessary to acquire a new certificate 7 each time before accessing an automation device 1, 2.

In a further step the connection between the client 3 and the automation device 1, 2 is set up. Here an authentication is requested by the automation device 1, 2 by means of an SSL client certificate. As a result the client 3 presents its certificate 7 together with the license information 8. If the client 3 does not have a valid certificate 7, no connection is set up.

Once authentication is complete, the license information 8 transferred with the client certificate 7 is evaluated by the automation device 1, 2. Depending on which access licenses the user has acquired beforehand, the automation device 1, 2 now permits access to particular functionalities or function modules.

In order to read out and evaluate the license information 8 and to ensure corresponding access by the user the automation device 1, 2 includes a licensing control unit or access control unit 9, which is preferably implemented as a computer program.

The licensing control unit or access control unit 9 of the automation device 1 can here be designed such that when it finds corresponding license information 8 it can permit access by the client 3 to further automation devices 2, which are grouped with it in a technological unit, for example consisting of all automation devices in a production line.

In summary, the invention thus relates to a method and a system for access licensing for an automation device 1, 2, in particular an industrial automation device. In order to simplify access licensing it is proposed to use client-side licenses. Thus the license is no longer linked to the automation device 1, 2.

The invention claimed is:
1. A method for providing authorized access to, and using a licensed functionalities in, a plurality of automation device in a computer network, comprising:
  establishing a connection between a client and licensing computer via the network to acquire by the client a security certificate for authorized access to one or more of the plurality of automation devices and to acquire one or more licenses for licensed use of licensed functionalities of one or more of the plurality of automation devices;
  receiving, from the licensing computer by the client, a security certificate along with license information for one or more licenses enabling licensed use by the client of licensed functionalities of one or more of the plurality of automation devices;
  receiving the security certificate along with license information from the client by a control unit of a first automation device of the plurality of automation devices;
  authenticating, by the control unit of the first automation device, a validity of the security certificate to permit authorized access by the client;
  evaluating, by the control unit of the first automation device, the license information for determining licensed use of licensed functionalities of one or more of the plurality of automation devices;
  permitting, by the control unit of the first automation device, authorized access to and licensed use of licensed functionalities of one or more of the plurality of automation devices which are grouped with the first automation device as a technical unit in accordance with the validity of the security certificate and the license information, wherein
  (i) the security certificate is presented to confirm authorized access at the automation device when a communication link is set up between the client and the automation device without licensing software having to be installed on the client, and
  (ii) the license information enabling licensed use includes approval information giving entitlement to use defined functions within the scope of the license thereby being stipulated,
  wherein the license information enabling licensed use by the client is transferred using a cookie mechanism along with the security certificate, and
  wherein the cookie mechanism is set up such that the client automatically presents the license information to the automation device as a cookie via a web browser of the client.

* * * * *